United States Patent [19]

Aldrich

[11] Patent Number: 5,031,283
[45] Date of Patent: Jul. 16, 1991

[54] MULTIFILAMENT HELICAL SEAMING ELEMENT

[75] Inventor: W. Daniel Aldrich, Starkville, Miss.

[73] Assignee: Niagara Lockport Industries Inc., Quincy, Fla.

[21] Appl. No.: 480,167

[22] Filed: Feb. 14, 1990

[51] Int. Cl.$^5$ .............................................. F16G 13/02
[52] U.S. Cl. ...................................... 24/33 P; 24/391
[58] Field of Search ............... 24/31 R, 31 W, 31 U, 24/33 R, 33 P, 33 C, 33 M, 397, 392, 396, 391; 139/383 A, 383 AA; 28/141; 162/DIG. 1; 245/10

[56] References Cited

U.S. PATENT DOCUMENTS

| | | |
|---|---|---|
| 1,775,232 | 9/1930 | Blair . |
| 2,883,734 | 9/1959 | Draper, Jr. .......................... 24/33 C |
| 2,929,135 | 3/1960 | Crombert et al. . |
| 3,147,529 | 9/1964 | Wilcken . |
| 3,263,291 | 8/1966 | Taylor . |
| 3,474,505 | 10/1969 | Glindmeyer . |
| 3,975,802 | 8/1976 | Moertel . |
| 4,144,911 | 3/1979 | Veith ................................ 28/141 X |
| 4,202,382 | 5/1980 | Westhead ........................ 139/383 A |
| 4,469,142 | 9/1984 | Harwood ........................... 245/10 X |
| 4,649,619 | 3/1987 | Romanski ................. 139/383 AA X |
| 4,737,241 | 4/1988 | Gulya . |
| 4,791,708 | 12/1988 | Smolens .............................. 24/33 C |
| 4,896,702 | 1/1990 | Crook ................................... 24/33 P |

FOREIGN PATENT DOCUMENTS

| | | | |
|---|---|---|---|
| 644819 | 9/1962 | Italy ........................................ 24/391 |
| 1445934 | 8/1976 | United Kingdom ............... 24/33 C |

Primary Examiner—James R. Brittain
Attorney, Agent, or Firm—Lorusso & Loud

[57] ABSTRACT

A helical coil seam construction for joining the ends of a length of papermakers fabric into a continuous loop is disclosed using a pair of generaly helical coils formed of a multifilament yarn subjected to a stiffening treatment with that stiffened yarn being formed into a helical coil. A first such coil is affixed to a first end of a length of papermakers fabric and a second coil, wound in the direction opposite to the winding of the first coil, is affixed to a second end of the fabric, opposed to the first end. Means are provided for releasably joining the coils with the loops thereof in an interengaged relationship, whereby the ends of the fabric are releasably joined to form a continuous loop of the fabric.

10 Claims, 2 Drawing Sheets

MULTIFILAMENT HELICAL SEAMING ELEMENT

BACKGROUND OF THE INVENTION

This invention relates generally to the field of papermaking fabrics and more particularly to structures for making separable seams to join the ends of such fabrics.

Papermaking fabrics, both forming fabrics and the felts used for wet pressing and for drying are conventionally woven either as a flat length of fabric or as an endless loop or band. The flat woven fabrics necessarily must have their opposed ends joined to form the necessary endless band used on papermaking machines. The endless woven fabrics may either be loaded onto the papermaking equipment in the endless form, or may be flattened into a double thickness length of fabric, with the ends of that double thickness fabric then being joined to form the installed endless loop or band. Where seaming is required, an increasingly popular approach has been to provide a separable pin seam in which a pin or pintle is inserted between interengaged loops on opposed ends of the fabric. Examples of this structure are plentiful, as in Codorniu, U.S. Pat. No. 3,815,645, Gisbourne, U.S. Pat. No. 4,244,084 and in Crook, U.S. application Ser. No. 279,040 filed Dec. 1, 1988 now U.S. Patent No. 4,896,702 and assigned to the assignee of this present application.

The removable pin seaming technique has become especially popular for press felts and dryer felts, due to the stiffness of those fabrics with their needled felt batt making them difficult to mount on the machinery in endless form. A particularly advantageous method of seaming such papermaking felt is disclosed in the Crook application Ser. No. 279,040 noted above. This technique utilizes two helical coils, with one each attached to the opposing ends of the base weave of the fabric. To seam this fabric the two coils are brought into interengagement with a pintle pin inserted therethrough to hold the seam closed. An alternative structure being investigated for seaming involves the use of slightly modified coils having locking heads formed thereupon to be mounted in a similar manner in a base weave to form a spiral zipper seam. This seam is generally similar in configuration to conventional plastic zippers commonly found on articles of clothing and is easily joined by a slider either of the conventional form, such as found on clothing, or in the form of modified pliers in which each jaw of the pliers carries one-half of the slider head.

While helical coil seaming arrangements, as noted above, have enjoyed substantial success when used on forming fabrics, they have experienced significant problems when incorporated in needled felts. These problems result from the material from which the helical coils are fabricated. In general, it has been found that, in order to form loops of sufficient rigidity to retain the seam, it has been necessary to fabricate the loops of a thermoset plastic monofilament, such as nylon or similar materials. However, when a coil manufactured of this type of material is subjected to the needling process to affix the felt batt to the base fabric, there is a high likelihood of a needle piercing one or more loops of the coil. Because of the use of this rigid monofilament, the piercing of a loop by one of the felting needles frequently either breaks the loop of the coil completely or damages it such that it will subsequently fail in the operating environment of the papermaking machine. This has limited the practicality of using the helical coil seaming technique on such felts.

SUMMARY OF THE INVENTION

In view of the desirability of the use of helical coil seaming techniques and the problems they have experienced when used with needled felts, it is an object of the present invention to provide such a helical coil seam construction for joining the ends of a length of papermakers fabric that is suitable for use on a needled felt. More particularly, it is an object of the present invention to provide such a seam construction that can maintain substantial structural integrity if pierced by a felting needle. To achieve these and other objects, which will become obvious to those skilled in the art, there is provided such a seam construction that includes a pair of generally helical coils with a first such coil being affixed to a first end of a length of papermakers fabric and the second coil being affixed to a second end, opposed to the first end of such fabric. Both of the coils are formed of a multifilament yarn subjected to a stiffening treatment with the stiffened yarn being formed into the coils with the second coil being wound in the direction opposite the winding of the first coil. This seam construction further includes means for releasably joining the coils with the loops thereof in an interengaged relationship, whereby the ends of the fabric are releasably joined to form a continuous loop of such fabric.

BRIEF DESCRIPTION OF THE DRAWINGS

Several preferred embodiments of the seam construction of the present invention will be described in detail below in connection with the drawings in which.

DESCRIPTION OF PREFERRED EMBODIMENTS

Figure 2:
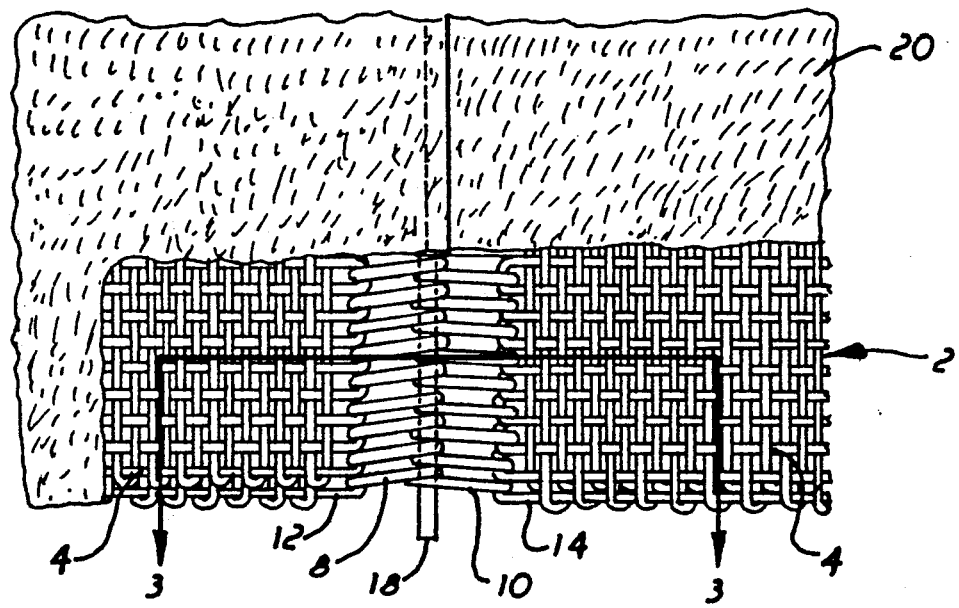
FIG. 2 represents a second embodiment of a helical coil pin seam construction in connection with a press felt.
Figure 3:
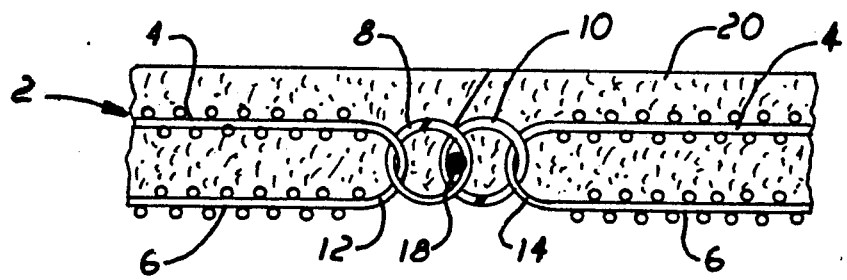
FIG. 3 is a sectional view taken along line 3—3 of FIG. 2.
Figure 1:
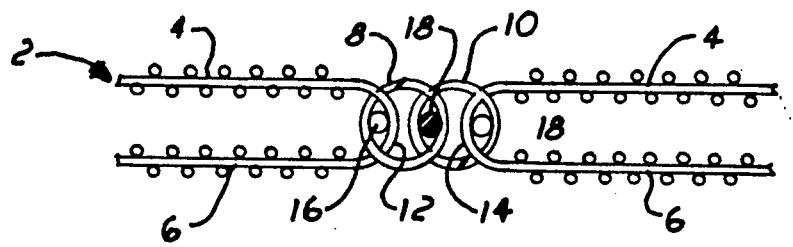
FIG. 1 is a side sectional view of one embodiment of a coil pin seam construction.

Various preferred embodiments of the seam construction of the present invention are illustrated in FIGS. 1-9. The seam constructions of FIGS. 1-3 are generally similar to those in the above-referenced application Ser. No. 279,040. FIG. 1 represents a side sectional view of a typical seam construction carried by a base fabric 2, which, in this embodiment, may conveniently be a double layer fabric having an upper layer generally defined by reference numeral 4 and a lower layer generally defined by reference numeral 6. In the embodiment of FIG. 1 the two seaming coils 8 and 10 may conveniently be inserted into the respective loops 12 and 14 formed at opposite ends of the fabric. Conveniently, these coils 8 and 10 may be inserted from outside the fabric such that one loop of each coil 8 and 10, respectively, projects between each adjacent pair of base fabric loops 12 and 14, respectively. Then, with the coil so inserted retaining filaments or pins 16 and 18 may be inserted, thus preventing movement of the coil outwardly of the loops 12 and 14 of the base fabric. The coils 8 and 10 preferably are of identical pitch, diameter and material, but are wound oppositely, one being a left hand helix and the other being a right hand helix, to provide for intermeshing in a manner to be described below. As shown in FIG. 1, the lengthwise extremities of the fabric 2 are brought together with the respective coils 8 and 10 interengaging one another, and a pintle 18 is inserted through the interengaged coils to lock them together to form a continuous looped base fabric.

A variation on the seam construction of FIG. 1 is illustrated in FIGS. 2 and 3. FIG. 2 is a plan view of needle-felted fabric comprising the base fabric 2, the ends of which are joined by the seam construction of the present invention, with that base fabric subsequently being needled with a batt material 20. The seam construction of FIGS. 2 and 3 is substantially similar to that of FIG. 1, and like reference numerals are used for corresponding components. However, in this construction the seaming coils 8 and 10 are inserted into the base fabric, prior to needling the batt, by either threading each coil into the multiplicity of respective loops 12 and 14 or by simply inserting those coils between the layers 4 and 6 of the base fabric and then pushing the coils through those loops 12 and 14, inherently effecting the interengagement between the coils 8 and 10 and those loops 12 an 14. The seamed base fabric 2 is then needled with the batt 20 to form the press felt or dryer felt.

Figure 4:
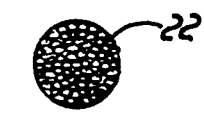
FIG. 4 is a cross sectional view on larger scale of a section of one type of yarn comprising the seaming coils of the embodiments of FIGS. 1-3.

While the basic coil seaming construction is similar to that of the prior art patents noted above, a significant improvement lies in the helical coil itself. While the helical coils of the prior art fabrics typically are fabricated of a monofilament of nylon or polyether-ethyl ketone (PEEK), it has been found that such a construction is subject to weakening or fracturing when pierced by any of the needles of the batt needling apparatus. Accordingly, the coils of the present invention are formed of a multifilament core yarn 22 impregnated by a generally rigid resin as shown in FIG. 4. This multifilament yarn may conveniently comprise a material such as 840-140 DuPont Type 716 multifilament yarn treated with a stiffening treatment. This treatment may conveniently comprise impregnation with a thermosettable resin, such as a conventional phenolic resin, which is then dried. The amount of phenolic resin utilized may conveniently be in the range between 8% and 10% of the weight of the filament. This phenolic treated yarn is then used as a feed stock for a conventional helical coiling machine. This machine wraps the yarn onto a mandrel and then conveys the yarn through an oven where the resin treatment is cured at a suitable temperature, which may be in the range of 250° F.-300° F., but may vary depending upon the type of resin used. This heating thus serves to set the phenolic resin, thus holding the resin treated yarn in the desired helical coil configuration. To obtain the maximum benefit of this invention, it is desirable that the core yarn be formed of a material that stiffens at a temperature substantially higher than the predetermined temperature utilized for setting the phenolic resin. The formed helical coils are then ready for insertion into the fabric for seaming as described above.

After the base fabric has been needled with the batt, it may be desirable to heat set the entire fabric and the multifilament yarn of the coil, using a temperature higher than that required for the setting of the phenolic resin. This will further strengthen the coil seam and may also be used to heat set the fabric itself. By deferring the final stiffening of the yarn forming the coil until after needling is completed, any penetration of the coil by the batt needles will cause little harm to the coil, as the needle will simply pass between the various filaments comprising the coil without causing serious weakening or fracturing.

Figure 5:
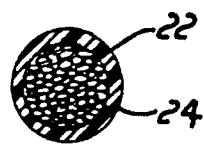
FIG. 5 is a sectional view of an alternative form of the yarn comprising the coils in FIGS. 1-3.

In FIG. 5 is illustrated an alternative form of the yarn in which the stiffening treatment comprises the application of a relatively rigid sheath formed of a suitable synthetic resin, such as nylon or other thermosettable resin. As noted above, it is preferable that this resin sheath 24 (FIG. 5) stiffen at a temperature substantially less than the temperature required to set the core yarn 22. Thus, in forming the helical coils, as noted above, the temperature of the mandrel will be sufficient to soften the sheath to provide for formation into the coils, with subsequent cooling then holding that coiled configuration in place. Alternatively, if a thermosettable resin is used to form the sheath, heating on the mandrel may serve to set the sheath and render it relatively rigid. As noted in connection with the yarn of FIG. 4, the core yarn 22 preferably is formed of a material that stiffens at a temperature substantially higher than the predetermined temperature utilized for setting the phenolic resin forming the sheath. With this yarn, as with that of FIG. 4, subsequent heat setting of the entire fabric and the multifilament yarn of the coil may be effected, using a temperature higher than that required for setting of the phenolic resin. An example of a sheathed yarn, such as that of FIG. 5 is manufactured by Birkenhoff and Drebes, GmbH under the name of Bedea-Multiplast Type 111, covered by Nylon 66. Obviously, numerous other yarns having related characteristics may be utilized equally well.

Figure 6:
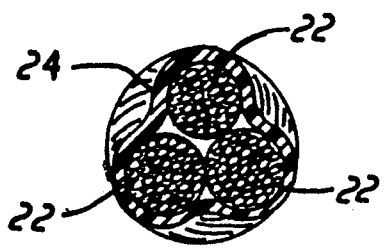
FIG. 6 is a sectional view of an alternative, plied form of the yarn comprising the coils in FIGS. 1-3.

Another alternative embodiment of the structure of the helical coil is shown in the cross section of FIG. 6. In this embodiment a plurality, preferably three, of ends of a multifilament yarn are formed by twisting the base yarn in one direction, which may suitably be the "Z" direction, with that twisting in one embodiment being conveniently at the rate of 17.5 turns per inch. These multiple ends of this yarn are then plied together by twisting in the opposite direction, which may conveniently be the "S" direction, and such plying may have conveniently a twist of about 7 turns per inch. After this multi-plied yarn is formed, the generally rigid sheath is added, conveniently as before. That is, in one embodiment, a thermosettable resin may be added to the plied yarns to form a sheath which is then dried. Then, as described above, the yarn and its sheath may be used as feed stock for a helical coiling machine to form the final multifilament helical coil used in the seam.

Figure 7:
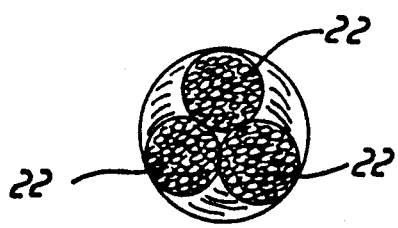
FIG. 7 is a sectional view of another alternative, plied form of the yarn comprising the coils in FIGS. 1-3.

A further alternative and even more preferred embodiment of the structure of the helical coil is shown in the yarn cross section of FIG. 7. In this embodiment a plurality, preferably 3, of ends of a multifilament yarn impregnated with a suitable thermoplastic resin, such as a conventional phenolic resin, are formed by twisting the base yarn in one direction, which may suitably be the "Z" direction, with those multiple ends of the yarn then plied together by twisting in the opposite direction, which may be the "S" direction to form the multi-plied yarn. When this multi-plied yarn is formed, it is then used as a feed stock for a conventional helical coiling machine that wraps the yarn onto a mandrel and conveys the yarn through an oven where the resin treatment is cured at a suitable temperature, as noted above. This heating thus serves to set the phenolic resin thus holding the multi-plied, resin treated yarns in the desired helical coil configuration without the requirement of any additional sheath, such as in FIG. 6.

Figure 9:
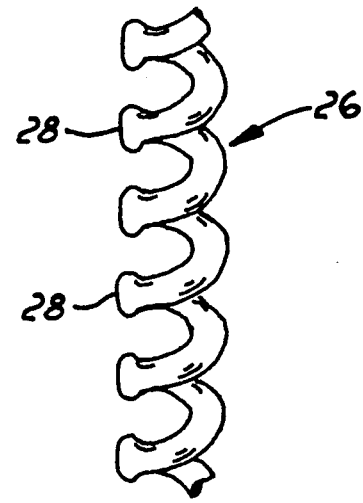
FIG. 9 is an illustration on a larger scale of one of the headed seaming coils utilized in the seam of FIG. 8.
Figure 8:
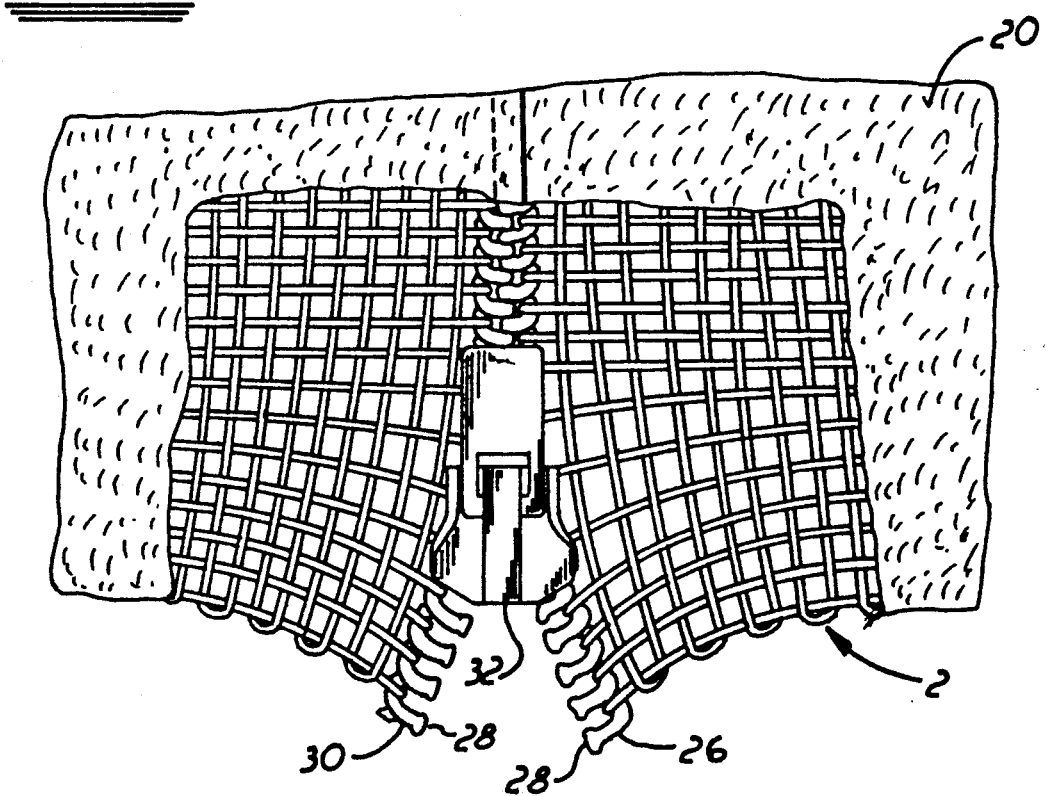
FIG. 8 illustrates a fabric similar to that of FIG. 2 but incorporating a spiral zipper seam.

In FIGS. 8 and 9 are illustrated another embodiment of the seam construction of this invention in which the coils are configured to form a "zipper" seam. To form this type of seam, the yarn is prepared in the manner described in connection with FIGS. 4 or 5, and the yarn is formed into a coil as described above. Then, in a manner well known to those in the art of forming zipper-type slide fastening seams, the coil, such as coil 26 in FIG. 9, is provided with an enlarged head portion 28 on each loop along one tangential side of the coil. Similarly, coil 30, wound in the direction opposite that of coil 26, is likewise provided with the enlarged head portions 28 along the line tangential to one side of the coil. This then provides the structure well known in zipper fasteners formed of synthetic resin. Also, in the conventional manner, a conventional slide member is provided to urge the two coils 26 and 30 together with their respective enlarged head portions 28 in mutually engaging relationship to close the seam, as shown in FIG. 8. This slide member 32 may conveniently be either the conventional type that is more or less permanently affixed to one or both of the coils 26 and 30, or may be of the plier type, having selectively separable halves that are brought together and applied to the coils only at the time that it is desired either to close or open the seam. The use of either type of slide member 32 is a matter of well known choice. Thus, the enlarged head portions on the coil and the slide member may jointly comprise means for releasably joining these coils with the loops in interengaged relationship. If desired, a locking pintle, such as pintle 18 in FIGS. 1–3 may subsequently be inserted into the interengaged coils 26 and 30 to lock them together, although such may not be required.

By the provision of the seam construction described above, there is provided a helical coil seam with enhanced strength due to the use of a multifilament core yarn in forming the coil. Such coil also enjoys the advantage of allowing a felting needle to pass through the coil member without sustaining strength reduction of the magnitude experienced by monofilament coils. Thus, the use of this type of seam will reduce the likelihood of seam failure due to fibrillation. Advantageously, this coil may be used in any of the typical felt weaves, thus permitting the yarn from which the base fabric is woven to be selected for optimization of performance of the fabric rather than the need for form stiff loops for a pin seam. It should also be apparent that this type of seam may be utilized advantageously on any of a number of types of papermakers fabrics, including, without limitation, wet press felts, dryer felts, conveyor fabrics, forming fabrics and any other fabric utilizing a separable seam. Accordingly, the foregoing description is intended to be illustrative only of the principles of this invention and is not to be considered limitative thereof. The scope of this invention is to be determined solely by the claims appended hereto.

What is claimed is:

1. A helical coil seam construction for joining the ends of a length of papermakers fabric into a continuous loop thereof, comprising
   a pair of generally helical coils with a first said coil being affixed to a first end of said length of papermakers fabric and said second coil being affixed to a second end, opposed to said first end, of said length of papermakers fabric, both said coils being formed of a yarn which yarn is formed of a plurality of twisted plies of multifilament yarn and is subjected to a stiffening treatment with said stiffened yarn being formed into said coils with said second coil being wound in the direction opposite the winding of said first coil; and
   means for releasably joining said coils with the loops thereof in an interengaged relationship, whereby the ends of the fabric are releasably joined to form a continuous loop of said fabric.

2. The seam construction of claim 1 wherein said joining means comprises pintle means inserted through said interengaged loops of said coils.

3. The seam construction of claim 1 wherein said stiffening treatment comprises application over said yarn of a sheath of a generally rigid synthetic resin.

4. The seam construction of claim 3 wherein said sheath comprises a thermosettable resin that becomes rigid when exposed to heat at a predetermined temperature.

5. The seam construction of claim 4 wherein said yarn is formed of a material that stiffens at a temperature substantially higher than said predetermined temperature, and wherein said treatment further comprises heating said yarn to said stiffening temperature after said yarn and said sheath are formed into said coils.

6. The seam construction of claims 1 wherein said treatment comprises impregnation of said yarn with a phenolic resin.

7. A helical coil seam construction for joining the ends of a length of papermakers fabric into a continuous loop thereof, comprising
   a pair of generally helical coils with a first said coil being affixed to a first end of said length of papermakers fabric and said second coil being affixed to a second end, opposed to said first end, of said length of papermakers fabric, both said coils being formed of a multifilament yarn subjected to a stiffening treatment with said stiffened yarn being formed into said coils with said second coil being wound in the direction opposite the winding of said first coil, said stiffening treatment comprising application over said yarn of a sheath of a thermosettable synthetic resin that becomes rigid when exposed to heat at a predetermined temperature, and said yarn being formed of a material that stiffens at a temperature substantially higher than said predetermined temperature, and said stiffening treatment further comprising heating said yarn to said yard material stiffening temperature after said yarn and said sheaths are formed into said coils; and
   means for releasably joining said coils with the loops thereof in an interengaged relationship, whereby the ends of the fabric are releasably joined to form a continuous loop of said fabric.

8. The seam construction of claim 7 wherein said yarn is formed of a plurality of twisted plies of said multifilament yarn.

9. The seam construction of claim 7 wherein said treatment comprises impregnation of said yarn with a phenolic resin.

10. The seam construction of claims 1 or 9 wherein said joining means comprises coupling heads on said coils for interengagement by a slide fastener, whereby the coupling heads maintain the interengagement of the coils.

* * * * *